US010303711B2

(12) United States Patent
Frank et al.

(10) Patent No.: US 10,303,711 B2
(45) Date of Patent: May 28, 2019

(54) UNSTRUCTURED VOLUMETRIC GRID SIMPLIFICATION USING SUB-VOLUME CLUSTERING

(71) Applicant: Schlumberger Technology Corporation, Sugar Land, TX (US)

(72) Inventors: Milan Frank, Oxfordshire (GB); Anton Alenov, Oxfordshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 244 days.

(21) Appl. No.: 15/282,278

(22) Filed: Sep. 30, 2016

(65) Prior Publication Data

US 2018/0096059 A1   Apr. 5, 2018

(51) Int. Cl.
| G06F 7/00 | (2006.01) |
| G06F 17/30 | (2006.01) |
| G06F 16/35 | (2019.01) |
| G06Q 50/06 | (2012.01) |

(52) U.S. Cl.
CPC .......... *G06F 16/353* (2019.01); *G06F 16/358* (2019.01); *G06Q 50/06* (2013.01)

(58) Field of Classification Search
None
See application file for complete search history.

(56) References Cited

U.S. PATENT DOCUMENTS

| 5,321,612 | A | * | 6/1994 | Stewart | .................... | G01V 1/00 374/136 |
| 5,523,759 | A | * | 6/1996 | Gillberg | ................ | G01S 13/953 342/26 B |
| 6,078,869 | A | | 6/2000 | Gunasekera | | |
| 7,965,291 | B1 | * | 6/2011 | Uralsky | .................. | G06T 17/20 345/423 |
| 8,743,115 | B1 | * | 6/2014 | Mallet | .................... | G01V 1/302 345/424 |
| 2011/0310101 | A1 | * | 12/2011 | Prange | .................. | G01V 99/00 345/420 |
| 2013/0120379 | A1 | * | 5/2013 | Adair | ..................... | G06T 19/00 345/420 |
| 2013/0275106 | A1 | | 10/2013 | Li et al. | | |
| 2014/0136171 | A1 | | 5/2014 | Sword, Jr. et al. | | |

(Continued)

FOREIGN PATENT DOCUMENTS

WO   2011/136861 A1   11/2011

OTHER PUBLICATIONS

Schroeder, et al., "Decimation of triangle meshes," SIGGRAPH Computer Graphics, Jun. 1997.

(Continued)

*Primary Examiner* — Tuan A Pham
(74) *Attorney, Agent, or Firm* — Jaime A. Castano

(57) ABSTRACT

A method, apparatus, and program product cluster a plurality of cells of an input unstructured volumetric grid representative of a subsurface volume into a plurality of clusters, simplify a boundary of each cluster and generate an output unstructured volumetric grid representing at least a portion of the input unstructured volumetric grid by generating in the output unstructured volumetric grid a respective cell for each of the plurality of clusters. The resulting output grid may be used to facilitate the generation of visualizations and/or numerical simulations.

20 Claims, 9 Drawing Sheets

(56) References Cited

U.S. PATENT DOCUMENTS

2014/0236559 A1* 8/2014 Fung ................... E21B 41/00
                                                        703/10
2015/0113379 A1* 4/2015 Wakefield ........... G06F 17/5009
                                                        715/227

OTHER PUBLICATIONS

Chopra, et al., "TetFusion: An Algorithm for Rapid Tetrahedral Mesh Simplification," IEEE Visualization 2002, Oct. 27-Nov. 1, 2002, Boston, MA USA.

International Search Report and Written Opinion for the equivalent International patent application PCT/US2017/054037 dated Jan. 19, 2018.

Lindstrom, "Out-of-Core Simplification of Large Polygonal Models," SIGGRAPH Jul. 2000, New Orleans, LA USA, pp. 259-262.

International Preliminary Report on Patentability for the equivalent International patent application PCT/US2017/054037 dated Apr. 11, 2019.

* cited by examiner

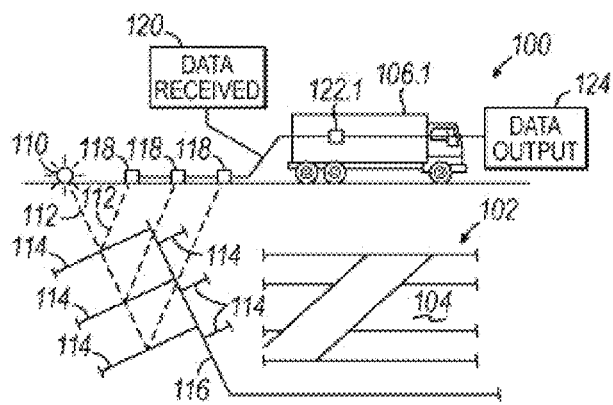
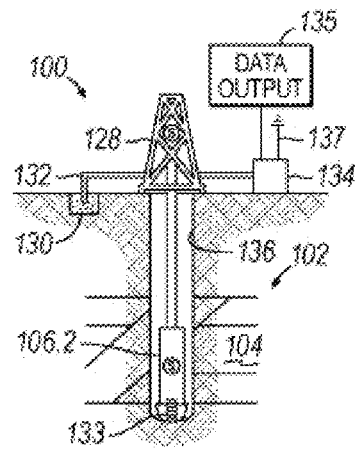
FIG. 2A  FIG. 2B
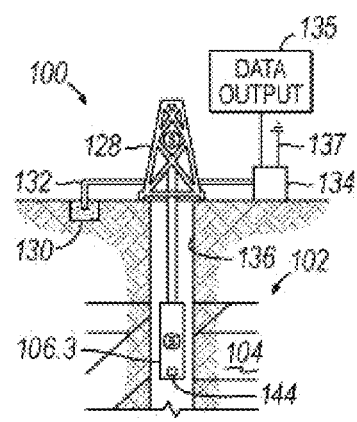
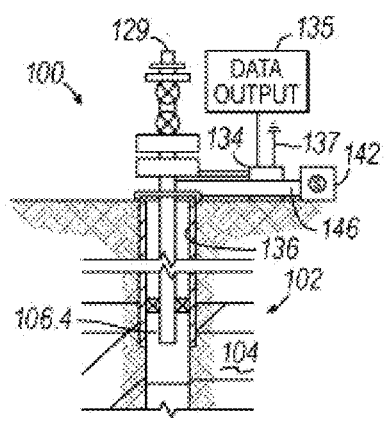
FIG. 2C  FIG. 2D

UNSTRUCTURED VOLUMETRIC GRID SIMPLIFICATION USING SUB-VOLUME CLUSTERING

BACKGROUND

Simulation and modeling software are used throughout the oil & gas industry for exploration, appraisal, development and production of oil fields. In addition, visualization tools incorporated into or external to such software are used to display and manipulate representations of petroleum reservoirs that are modelled as large volumes subdivided into cells. Models continue to get increasingly more complex, however, and may include millions of cells or more, which can present difficulties when attempting to generate visualizations due to the large volume of information encompassed within the millions of cells and the computing overhead associated with generating visualizations therefrom. These difficulties are further exacerbated for three-dimensional representations and/or interactive representations that enable a user to modify the visualization in real-time (e.g., by zooming in/out, changing the viewpoint, etc.). Furthermore, whereas many reservoir models are based upon structured grids comprised of regular arrays of cubic cells, reservoir modeling is increasingly relying on unstructured volumetric grids to provide a more accurate and detailed modeling of complex subsurface features, and the calculations associated with unstructured volumetric grids can further increase the computing overhead associated with generating visualizations. A need therefore exists for a manner of reducing the computing overhead associated with generating visualizations for unstructured volumetric grids.

SUMMARY

The embodiments disclosed herein provide a method, apparatus, and program product that cluster a plurality of cells of an input unstructured volumetric grid representative of a subsurface volume into a plurality of clusters, simplify a boundary of each cluster and generate an output unstructured volumetric grid representing at least a portion of the input unstructured volumetric grid by generating in the output unstructured volumetric grid a respective cell for each of the plurality of clusters. The resulting output grid may be used to facilitate the generation of visualizations and/or numerical simulations.

In some embodiments, clustering the plurality of cells includes generating a first cluster among the plurality of clusters by traversing adjacency data associated with the input unstructured volumetric grid, and selectively adding adjacent cells to the cluster based upon a clustering criterion. In some embodiments, the clustering criterion selectively adds an adjacent cell to the cluster based upon a maximum distance from a cluster center to a cluster outer bound, and in some embodiments, the clustering criterion selectively adds an adjacent cell to the cluster based upon one or more of a previous decision, a property of the cluster, a property of the adjacent cell, or a property of the input unstructured volumetric grid. Some embodiments also determine one or more properties used when evaluating the clustering criterion during a pre-processing stage prior to clustering the plurality of cells.

Some embodiments also include fusing together cell faces on the boundaries between adjacent clusters to generate coarse boundaries between clusters, and in some embodiments simplifying the boundary of each cluster includes merging or removing features of relatively low significance from each boundary. Some embodiments further include discarding interior nodes or interior faces from each cluster among the plurality of clusters. In addition, in some embodiments, simplifying the boundary of each cluster includes grouping outer and shared faces of cells in the clusters respectively into outer and shared boundaries, combining adjacent outer faces of outer boundaries while preserving general topology, combining adjacent shared faces of shared boundaries, and collapsing low connectivity vertices into adjacent higher connectivity vertices.

Some embodiments also include removing repeated vertices in faces, removing faces with less than three line segments and removing clusters with less than four faces. Some embodiments also include generating a visualization using the output unstructured volumetric grid. In some embodiments, generating the visualization includes using one or more cells from the output unstructured volumetric grid for one or more background regions of the visualization and using one or more cells from the input unstructured volumetric grid for one or more foreground regions of the visualization. Some embodiments also include using the output unstructured volumetric grid as an upscaled grid in a numerical simulation.

Some embodiments may also include an apparatus including at least one processing unit and program code configured upon execution by the at least one processing unit to perform any of the above-described operations. Some embodiments may also include a program product including a computer readable medium and program code stored on the computer readable medium and configured upon execution by at least one processing unit to perform any of the above-described operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

Figure 1:
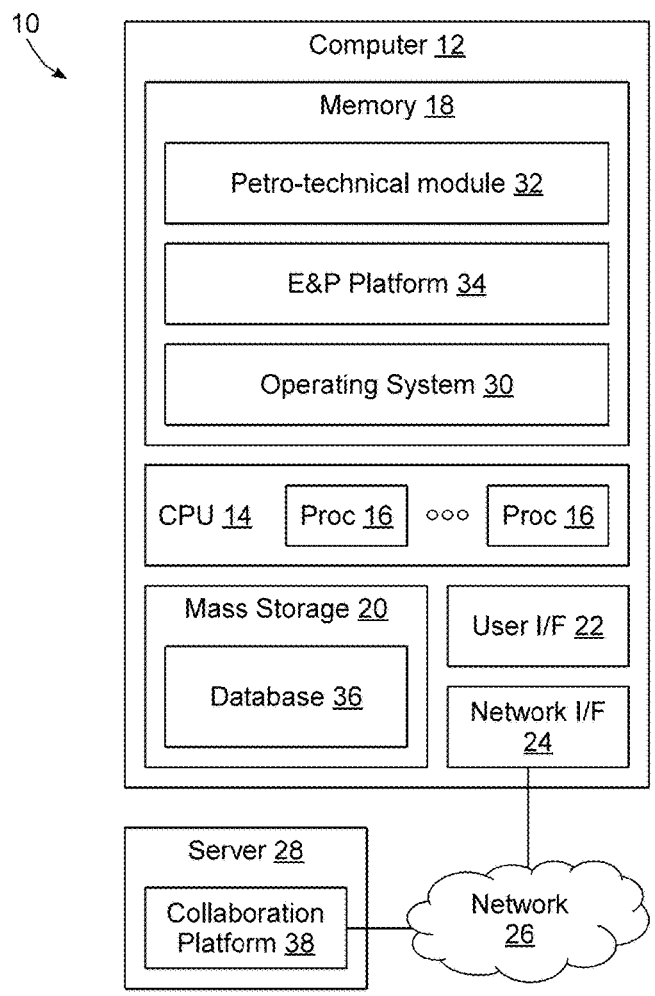
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
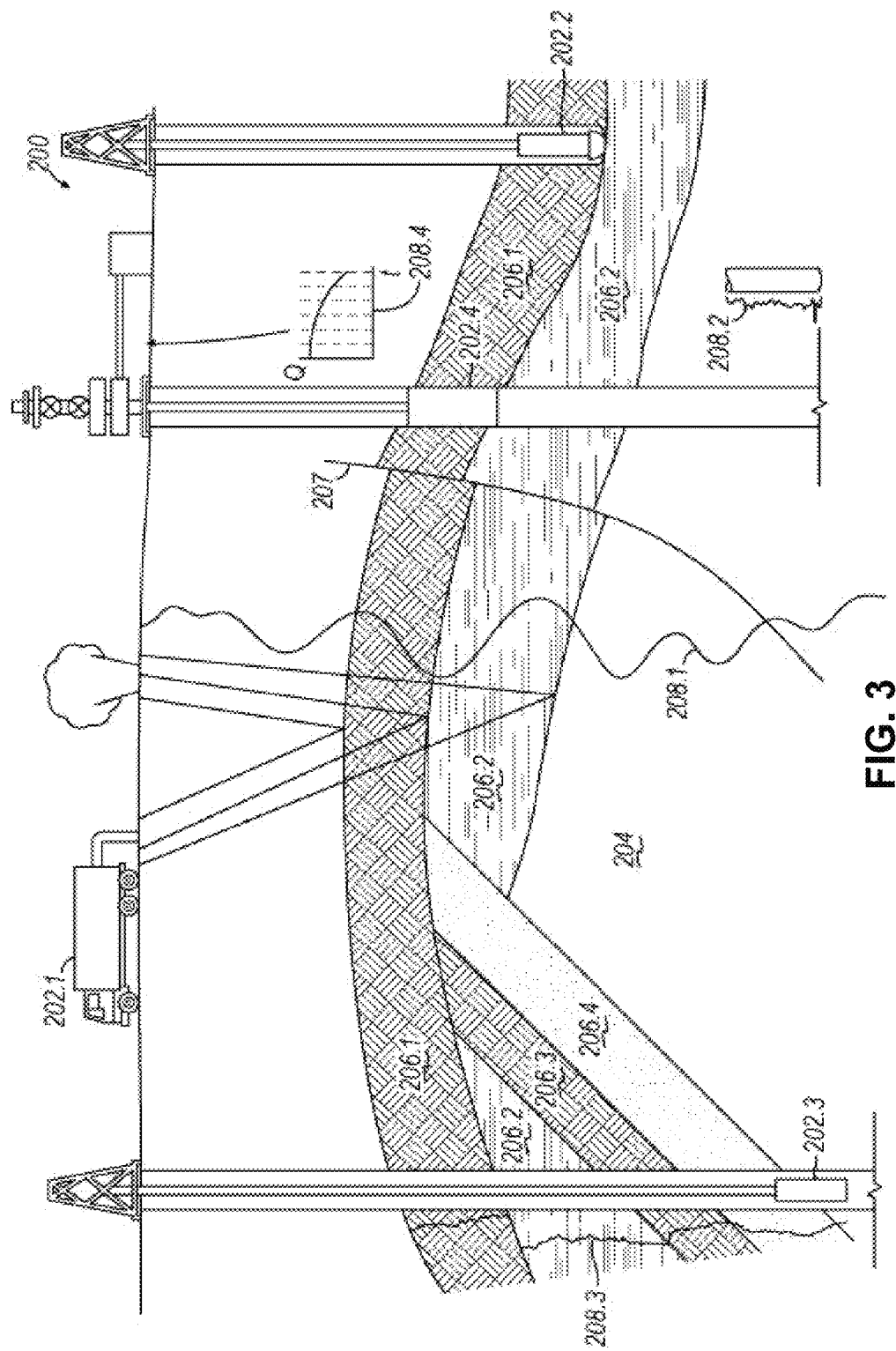
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
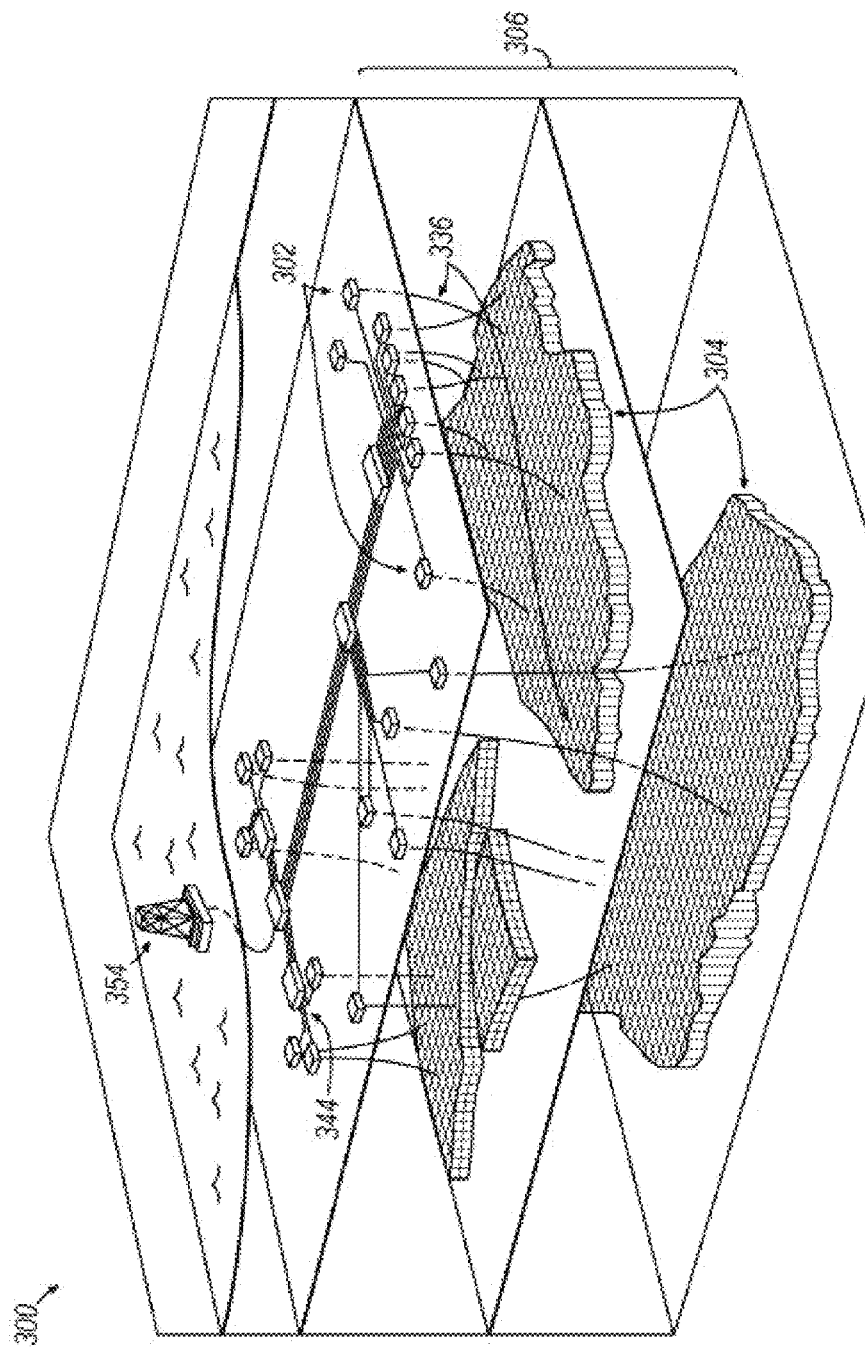
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Unstructured Volumetric Grid Simplification Using Subvolume Clustering

An unstructured volumetric grid within the context of reservoir simulation and modeling is a discretization of a finite, three dimensional Euclidian space into sub-volumes called cells. A cell is explicitly defined by its surface, defined by an unordered set of four or more faces fully enclosing the space, and a face is a closed polygon that includes three or more line segments. A face may be non-planar in some embodiments, and in some embodiments, a face may be convex or star-shape concave (as projected to its best fitting plane). Some faces may also be considered to be shared by two cells, forming a boundary between them. Moreover, unstructured grids may also describe inter-cell topology by keeping track of cell adjacency information (i.e., what cells are adjacent to one another and thus share a face. Thus, with an unstructured grid, given a face, it is generally possible to identify each of the cells that use it.

The generation of visualizations, i.e., two or three dimensional illustrations of a volume displayed on a computer display or imaged by an imaging device, can be computationally expensive for unstructured volumetric grids, particularly larger grids including millions of cells or more, which can lead to either an inability to view an entire grid or larger portions of a grid, or in the least poor response times that in some instances can render practically useless real time interaction with such visualizations by a user.

Embodiments consistent with the invention, on the other hand, may reduce the overall number of vertices used to represent a model by clustering adjacent cells, transforming these clusters into cells, and outputting those new cells as a simplified grid, thereby effectively "fusing" cells into larger cells, as defined by the clusters. Doing so may simplify at least a portion of an unstructured volumetric grid to effectively provide a reduced resolution for the portion of the grid and thereby reduce the computing resource demands for generating and/or updating that portion of the grid. In some embodiments a simplified grid may be combined with an original grid such that different regions of a model may be rendered at different effective resolutions to present an accurate and sufficiently detailed visualization using reduced computational resources.

A reduced resolution portion represented by a simplified grid may be, for example, arranged in out-of-focus areas of a visualization, such that the reduced resolution does not substantially adversely impact the information conveyed by the visualization, and such that real-time interaction with a visualization may be maintained even when viewing larger portions of a complex unstructured volumetric grid. The approach may therefore be considered to be a type of "level-of-detail" technique that uses data of varying accuracy to balance image quality with system responsiveness.

While embodiments consistent with the invention may be used in other applications, one suitable application is in connection with workflows associated with modeling geological structures that are generally poorly served by regular or structured grid types such as pillar grids, stair step grids, etc. and associated tools. Due to industry demands and the extra freedom provided to users, such models continue to get increasingly more complex, counting many millions of cells or more per model, which as noted above can be beyond the capabilities of many computer systems in terms of displaying this amount of information interactively or at all if the model is exceptionally large. Furthermore, generally fine details of a grid are only meaningful when they are "in front" or in the foreground, and closest to the view point, so it is generally acceptable to use a coarser representation at a lower resolution for areas that are further away from the view point, i.e., in the background.

The technique described herein addresses these concerns in part by processing an initial unstructured volumetric grid, referred to herein as an input grid, in order to create a lower resolution representation, referred to herein as an output grid, that still preserves major visual elements (such as outline shapes, fault lines, horizons, etc.) and then using that lower resolution representation in "out-of-focus" portions of a visualization. In this regard, an "out-of-focus" portion of a visualization may be considered to refer to a portion of a visualization that is generally in the background and distal from a view point of the visualization and that is otherwise not the primary data being represented in the visualization, i.e., data that is effectively not the primary subject of a visualization. It will be appreciated that "out-of-focus," however, does not necessarily imply blurriness in a photography sense, only a lower resolution, which it should be noted may not necessarily even result in a lower displayed resolution when the out-of-focus portion is relatively far away from the view point and thus is rendered relatively small in size in the visualization.

In the illustrated embodiments, simplification of an unstructured volumetric grid may achieve relatively high simplification rates by clustering cells according to a decision algorithm, discarding cell nodes and faces interior to each cluster, and simplifying the boundaries between clusters. Each cluster may then be written as a single cell in an output unstructured volumetric grid. Doing so may therefore enable scalable visualization of very large unstructured volumetric grids or meshes with moderate computational demands.

Figure 5:
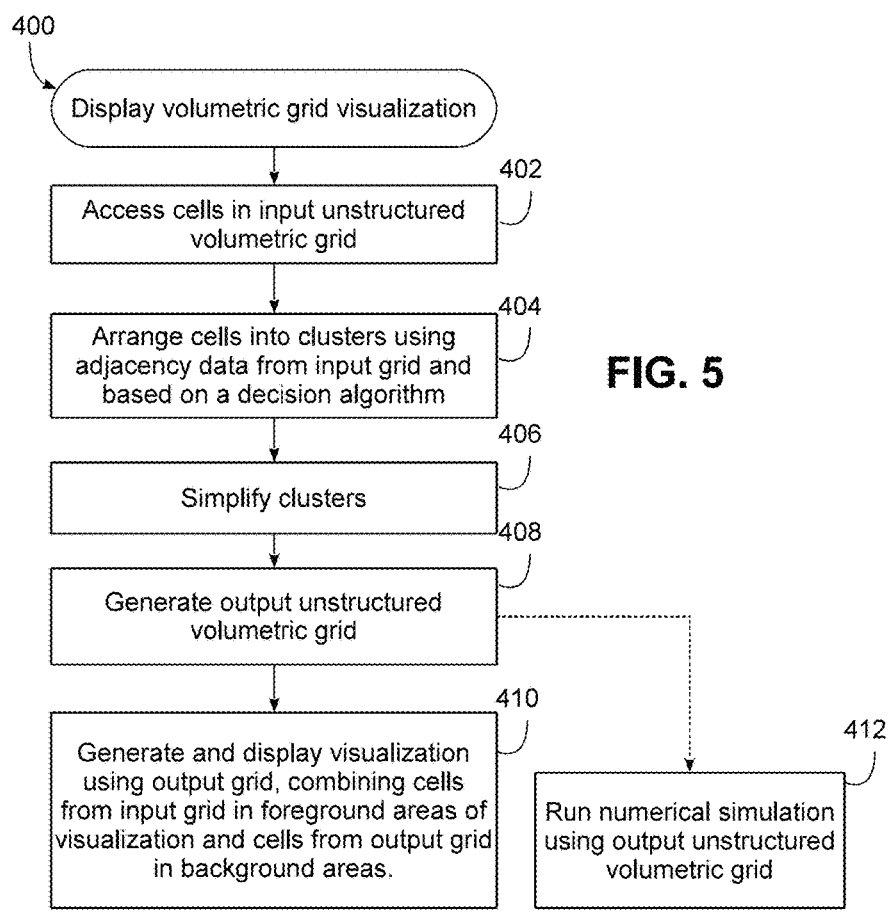
FIG. 5 is a flowchart illustrating an example sequence of operations for generating a visualization using the data processing system of FIG. 1.

As shown in FIG. 5, for example, an example implementation of a display volumetric grid visualization routine 400 suitable for implementation in computer system 100 to generate and display an output grid based upon an input unstructured volumetric grid. Routine 400 may begin in block 402 by accessing cells of an input unstructured volumetric grid.

Next, in block 404 the cells of the grid may be arranged into clusters. In some embodiments, for example, clusters may be constructed one at a time by traversing adjacency data provided by the unstructured volumetric grid, and querying a decision algorithm for each cell adjacent to the cluster. Cluster construction may end when no more adjacent cells can be added to it. As will become more apparent below in connection with FIG. 6, the decision to add a cell to a cluster may be based on different types and/or combinations of data in different embodiments, e.g., based on any or all of the following: previous decisions, properties of the cluster, properties of the cell, and general properties of the grid. In addition, in some embodiments, the decision algorithm may use various machine learning techniques in order to make decisions.

Next, in block 406, the clusters generated in block 404 may be simplified to facilitate the creation of cells in the simplified output grid. Simplification in some embodiments may include various operations, including, for example, coarsening cluster boundaries by fusing together the cell faces on the boundaries between adjacent clusters, and simplifying the outlines of cluster boundaries to merge or remove features of relatively low significance (one example simplification operation is discussed below in connection with FIG. 7). Next, in block 408 an output unstructured volumetric grid is generated, e.g., by writing each cluster into the grid as a single cell, with the simplified cluster boundary generated in blocks 404 and 406 acting as the faces of the output grid cell. In addition, at this time nodes that are no longer used by the grid may be discarded, thereby reducing the number of cells in the output grid. Among these nodes may include the nodes that are interior to (i.e., that do not contribute to the boundary of) each cluster, which may also result in the discarding of cell faces that are also interior to a cluster. In effect, therefore, the cell in the output grid corresponding to each cluster represents the merger of the cells in the input grid that have been assigned to that cluster. Further details regarding an example implementation of block 408 are discussed below in connection with FIG. 8.

Next, in block 410, a visualization based upon the output grid is generated, and optionally displayed on a computer display, or stored in a memory or storage device or output to an imaging device, whereby routine 400 is then complete. It will be appreciated that the output grid is a lower resolution alternative of at least a portion of the dataset for the input grid that can be used to substitute areas of the input grid where fine detail is already not apparent to the user, e.g., in the background or in out-of-focus areas. For foreground areas where fine detail is desired, the original input grid may be used. Doing so therefore allows for a configurable trade-off between visual quality and interactivity.

Thus, in some embodiments, the herein-described techniques may be used for pre-processing grids and creating alternate lower resolutions of an input dataset. These alternate representations may then be subsequently employed in a camera position-sensitive, level-of-detail visualization engine.

In addition, as illustrated in block 412, the output grid may also be used in some embodiments to run a numerical simulation, either as an alternative to block 410 or in addition to block 410. As such, the herein-described techniques may be used in some embodiments for upscaling purposes, e.g., to speedup numerical simulation on structured grids (e.g. pillar grids). Thus, in some embodiments, simplified grids produced by the herein-described techniques may operate effectively as upscaled grids capable of being input into numerical engines such as numerical flow simulators to run flow simulation and thereby generate a quick preview.

Figure 6:
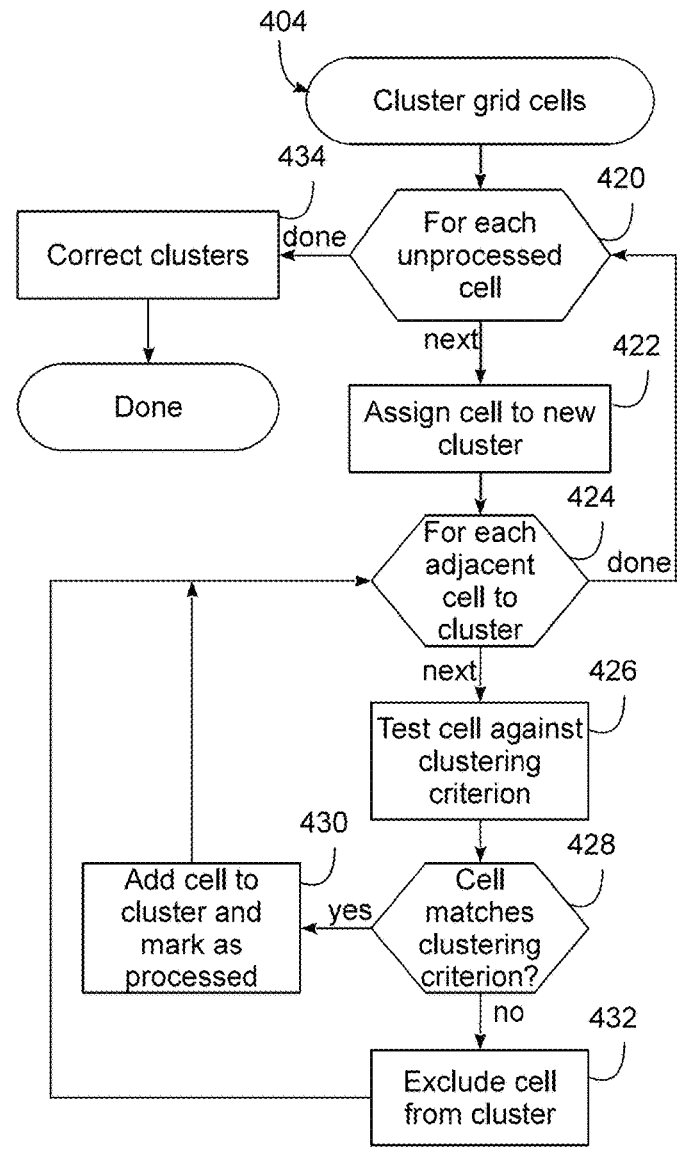
FIG. 6 is a flowchart illustrating an example implementation of the clustering block referenced in FIG. 5.

Now turning to FIG. 6, an example implementation of block 404 of FIG. 5 is illustrated in greater detail. It will be appreciated that for the purposes of this implementation a cluster may be considered to be a set of one or more cells from the input unstructured volumetric grid, and clustering may be used to assign cells to various clusters such that each cluster can later be translated to a single cell representative of the input grid cells assigned to that cluster. Each cell assigned to a cluster may be considered to be adjacent to (i.e., share a face with) at least one other cell within the same cluster (unless the cluster is composed of a single cell).

Blocks 420-432 implement a cluster assignment operation, whereby the input unstructured volumetric grid is traversed effectively as an undirected graph by using cell adjacency information associated with the grid. Here, cells may be considered to be the nodes of the graph, while faces shared between cells may be considered to represent the edges.

To begin, each cell may be considered to be unprocessed, and cluster assignment may proceed until each cell has been "processed," i.e., assigned to a cluster. Additionally, in some embodiments, during assignment each cluster may additionally maintain a list of "seen" cells in order to avoid processing the same cell twice. Clusters may be constructed one at a time in this implementation, although the invention is not so limited.

As illustrated in block 420, a FOR loop may be initiated to process each unprocessed cell in the input grid. Selection of unprocessed cells may be based upon a predetermined order, based upon proximity to clusters, random, etc. For each unprocessed cell, block 420 passes control to block 422 to assign the cell to a new cluster. Next, block 424 initiates another FOR loop to process each cell adjacent to the cluster, and it will be appreciated that as cells are added to the cluster, the cells that are considered to be adjacent to the cluster will change.

For each adjacent cell, control passes to block 426 to test the cell against a predetermined clustering criterion, e.g., maximum distance from cluster center to its outer bounds and/or any of the other criteria mentioned above such as previous decisions, properties of the cluster, properties of the cell, and/or general properties of the grid. Block 428 then determines whether the addition of the cell matches the clustering criterion, i.e., whether adding this cell to the cluster does or does not invalidate the clustering criterion. If the criterion is matched, control passes to block 430 to add the cell to the cluster and mark the cell as processed. Control then returns to block 424 to process other adjacent and unseen adjacent cells to consider those cells for cluster membership. Returning to block 428, if adding the cell would invalidate the clustering criterion, control instead passes to block 432 to exclude the cell from the cluster, including marking the cell such that it will no longer be considered for this cluster (i.e., mark the cell as seen), and then return to block 424 to process other adjacent cells. The cell, however, will remain unprocessed in the context of the overall clustering mechanism such that the cell will be processed for membership in other clusters. Once adjacent cells to the cluster have been processed, block 424 returns control to block 420 to select another unprocessed cell from which to generate a new cluster.

Returning to block 426, the clustering decision process in some embodiments may be handled by a separate entity that is passed into the clustering algorithm, and which may be called when a new cluster is started and for each cell considered for cluster membership. Such an entity may keep track of information related to the cluster (and/or the grid as a whole), which it may then use to make its decisions. Decisions may be made based on properties that may be computed during a pre-processing stage in some embodiments, or in some embodiments lightweight enough to compute directly in block 426, although more complex mechanisms can be used in other embodiments. In such a manner, the clustering process illustrated in FIG. 6 may remain lightweight, while offering flexibility for different applications.

Now returning to block 420, once all cells have been processed, control passes to block 434 to perform cluster correction. It will be appreciated that in some embodiments, clustering decisions may be based on immediately available information, which may result in some decisions leading to problematic clustering (e.g., a cell sur-rounded on all sides by cluster #1, but itself belonging to cluster #2—in this case, the cell probably belongs in cluster #1). Thus, it may be desirable in some embodiments to optionally perform cluster correction to iterate over each cell and attempt to correct these types of issues by examining the cluster assignments of its adjacent cells. In some embodiments, for example, a new cluster may be assigned based on the majority surrounding cluster.

It will be appreciated that in some embodiments, upon completion of block 434, some cells may be assigned to no cluster. In this case, such cells may be ignored by the rest of the algorithm (and as such are effectively removed from the grid).

Figure 7:
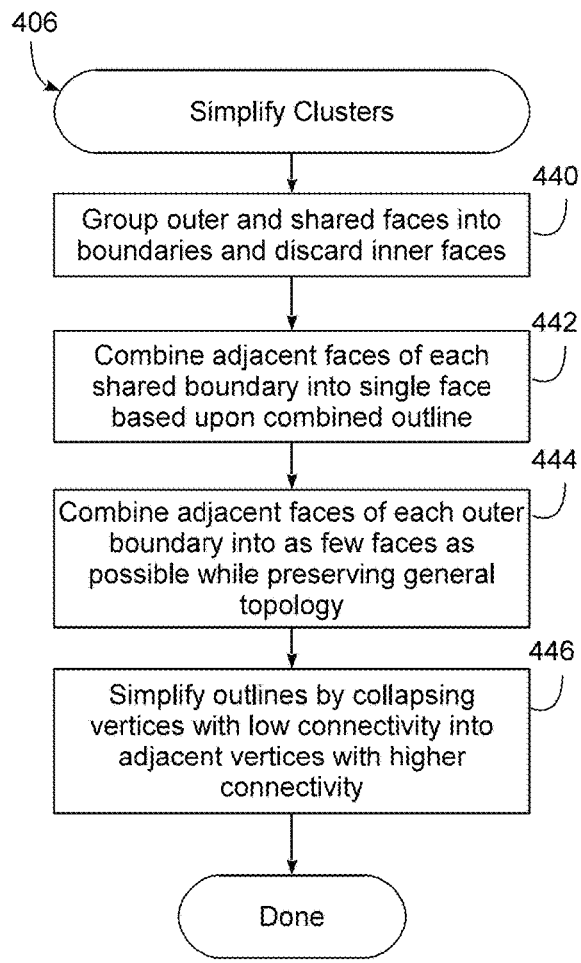
FIG. 7 is a flowchart illustrating an example implementation of the simplification block referenced in FIG. 5.

Now turning to FIG. 7, an example implementation of block 406 of FIG. 5 is illustrated in greater detail. It will be appreciated that for the purposes of this implementation simplification may be used to further process the clusters generated as described above in order to facilitate the creation of cells in the simplified output grid. For the purposes of this implementation, cell faces may be classified into three categories:

Outer faces: faces belonging to only one cell (generally faces on the outside of the model).

Shared faces: faces belonging to cells from more than one cluster.

Inner faces: faces belonging exclusively to cells from the same cluster.

First, in block 440, boundary extraction is performed, whereby outer and shared faces are grouped into boundaries, and inner faces are effectively discarded. Within this context, a "boundary" may be considered to be the set of either all "outer" faces of a cluster or "inter-cluster" faces shared by two clusters. For example, two cubes sharing a face would yield one "shared" boundary including the shared face and two "outer" boundaries, each including five outer faces (all but the one shared face on each cube). In some embodiments, each face's index may be either recorded as part of a boundary or ignored, and boundaries may be defined by either one cluster ID (for "outer" faces) or two cluster IDs (for "shared" faces).

Next, in blocks 442 and 444, surface simplification may be performed to combine faces within the same boundary and thereby produce a simplified version of the surface described by each boundary. As shown in block 442, adjacent faces of a "shared" boundary may be combined into a single face by taking their outline. In the case where the boundary includes N disjoint sets of faces, the result may be N faces, each corresponding to the combined outline of a single set. As shown in block 444, adjacent faces of an "outer" boundary may be combined into as few faces as possible while preserving general topology, e.g., by selecting a face in the set and iteratively checking each adjacent face.

Faces with similar normals may be combined and their outline may be taken, and this operation may be repeated until each face has been selected as part of a set. In the case of external faces, the normal checking operation may also be made arbitrarily complex. For instance, in some embodiments the normal of the combined face may be updated for each face added. A post combination operation may then check the resulting normals of adjacent combined faces to check whether they can be combined further.

The outline extraction process for each of blocks 442 and 44 may be implemented in a similar fashion, e.g., by extracting and counting edges from each face in the set. Edges that occur once may be stitched together into a single face.

Next, in block 446, outline simplification may be performed to analyze the outlines of the faces produced above to remove redundant vertices. Block 446 in some instances may iterate over the faces to remove vertices with low connectivity by collapsing them into adjacent vertices with higher connectivity. For example, vertices may be considered to have low connectivity if they have less than two or less edges.

Figure 8:
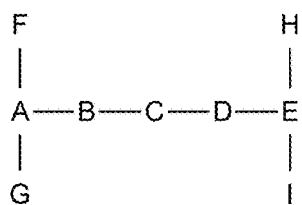
FIG. 8 is an example graph of interconnected vertices.
Figure 9:
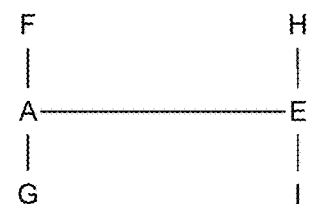
FIG. 9 illustrates outline simplification performed on the example graph of FIG. 9.

For example, FIG. 8 illustrates an example arrangement of vertices A-I, which through the operation of block 446 may remove vertices having two or fewer edges, e.g., vertices B-D, and directly connect vertices A and E. The result of such an operation is illustrated in FIG. 9.

Such an operation may be implemented, for example, by iterating over each node with a non-zero number of connections. Vertices with three or more edges may be left as is, while nodes with two or fewer edges may be collapsed into other nodes along their edges until a node with three or more edges is reached.

In the case where an independent loop (e.g., where each vertex has two connections) is detected, the nodes within the loop may be collapsed into a single node, which may then be removed by a later stage.

Figure 10:
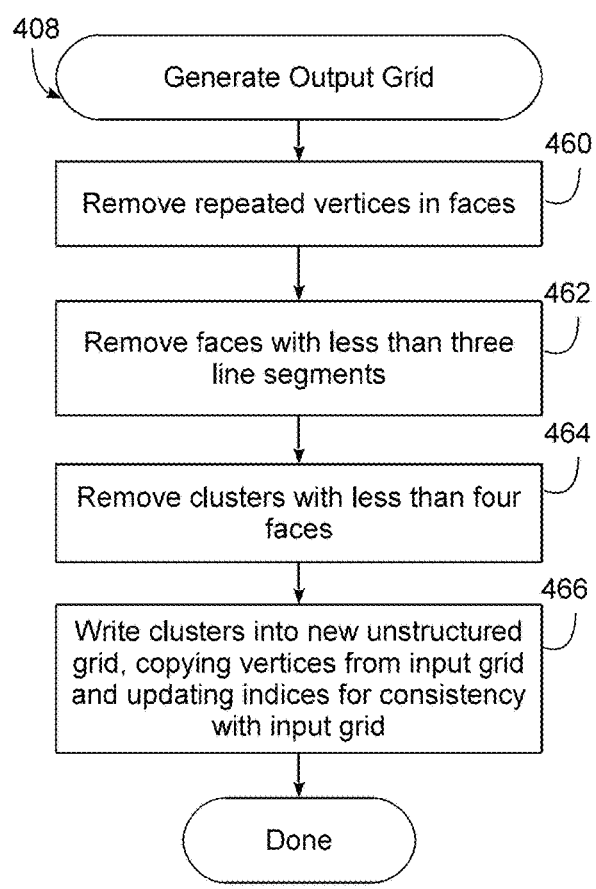
FIG. 10 is a flowchart illustrating an example implementation of the output grid generation block referenced in FIG. 5.

Next, turning to FIG. 10, an example implementation of block 408 of FIG. 5 is illustrated in greater detail. In this stage, information from the surface and outline simplification stages (blocks 404 and 406) may be combined in order to compose a simplified output grid.

First, in blocks 460-464, consistency checking may be performed to reconstruct the clusters from the boundaries to ensure that each resulting cluster represents a valid cell. In block 460, repeated vertices in faces are removed, and in block 462 faces with less than three line segments are removed. In block 464, clusters with less than four faces are removed. In the case of cluster removal, the boundaries previously shared with that cluster become outer boundaries, provided the other cluster is not removed, and outer boundaries of the removed cluster are simply removed.

Next, in block 466, the remaining clusters are written as a new unstructured volumetric grid. Vertices are copied from the original input grid and indices are updated to be consistent with the newly created grid. In general, each cluster may be written as a single cell in the output grid in some embodiments, although it will be appreciated that in some embodiments some clusters may be written as more than one cell and/or some clusters may be written as zero cells.

Figure 11:
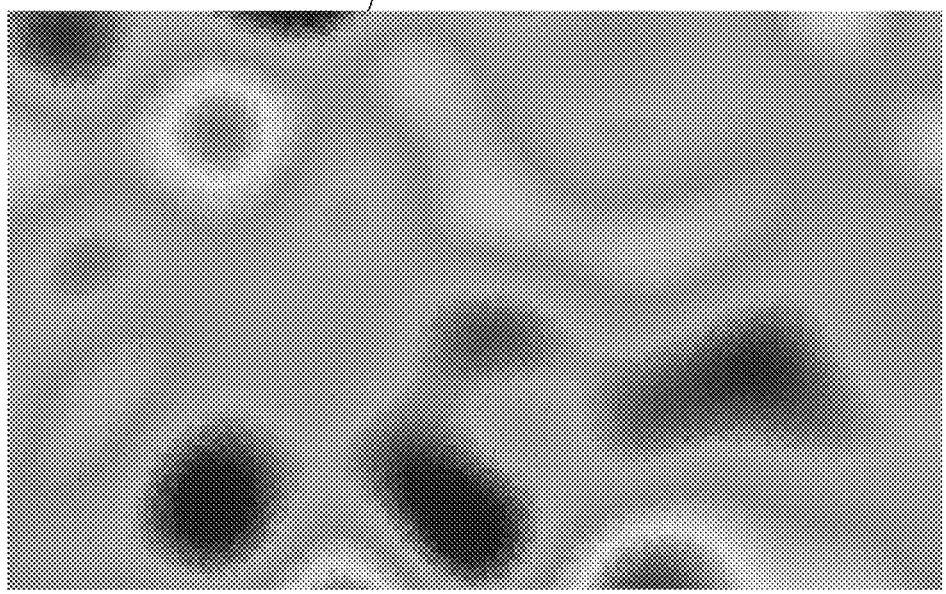
FIGS. 11 and 12 are visualizations of example input and output unstructured volumetric grids, illustrating simplification of the input grid and generation of the output grid using the sequence of operations of FIG. 5.
Figure 12:
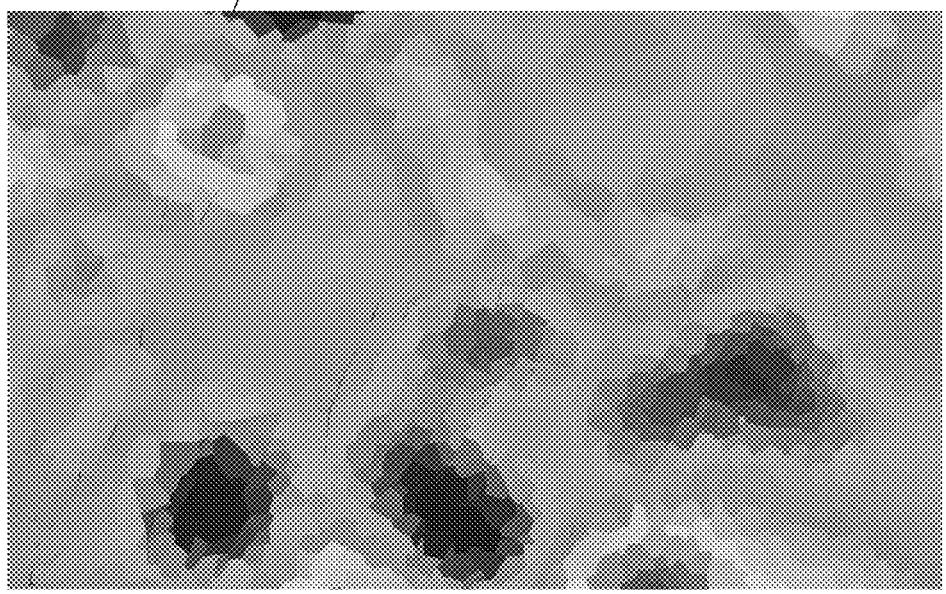

As further illustration of the operation of the herein-described techniques, FIG. 11 illustrates an input unstructured volumetric grid 480, while FIG. 12 illustrates an output unstructured volumetric grid 482 generated from input grid 480 using the techniques described herein.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method executed by a data processing system including one or more processors coupled to a memory, comprising:
    using at least one processor among the one or more processors, clustering a plurality of cells of an input unstructured volumetric grid representative of a subsurface volume into a plurality of clusters, each cluster having a boundary;
    using at least one processor among the one or more processors, simplifying the boundary of each cluster among the plurality of clusters by combining one or more faces of one or more cells in each cluster among the plurality of clusters; and
    using at least one processor among the one or more processors, generating and storing in the memory for use in a numerical simulation or visualization an output unstructured volumetric grid representing at least a portion of the input unstructured volumetric grid by generating in the output unstructured volumetric grid a respective cell for each of the plurality of clusters and having the simplified boundary;
    wherein simplifying the boundary of each cluster includes:
        grouping outer and shared faces of cells in the clusters respectively into outer and shared boundaries;
        combining adjacent outer faces of outer boundaries while preserving general topology;
        combining adjacent shared faces of shared boundaries; and
        collapsing low connectivity vertices into adjacent higher connectivity vertices.

2. The method of claim 1, wherein clustering the plurality of cells includes generating a first cluster among the plurality of clusters by:
    traversing adjacency data associated with the input unstructured volumetric grid; and
    selectively adding adjacent cells to the cluster based upon a clustering criterion.

3. The method of claim 2, wherein the clustering criterion selectively adds an adjacent cell to the cluster based upon a maximum distance from a cluster center to a cluster outer bound.

4. The method of claim 2, wherein the clustering criterion selectively adds an adjacent cell to the cluster based upon one or more of a previous decision, a property of the cluster, a property of the adjacent cell, or a property of the input unstructured volumetric grid.

5. The method of claim 2, further comprising determining one or more properties used when evaluating the clustering criterion during a pre-processing stage prior to clustering the plurality of cells.

6. The method of claim 1, further comprising fusing together cell faces on the boundaries between adjacent clusters to generate coarse boundaries between clusters.

7. The method of claim 1, wherein simplifying the boundary of each cluster includes merging or removing features of relatively low significance from each boundary.

8. The method of claim 1, further comprising discarding interior nodes or interior faces from each cluster among the plurality of clusters.

9. The method of claim 1, further comprising removing repeated vertices in faces, removing faces with less than three line segments and removing clusters with less than four faces.

10. The method of claim 1, further comprising generating a visualization using the output unstructured volumetric grid.

11. The method of claim 10, wherein generating the visualization includes using one or more cells from the output unstructured volumetric grid for one or more background regions of the visualization and using one or more cells from the input unstructured volumetric grid for one or more foreground regions of the visualization.

12. The method of claim 1, further comprising using the output unstructured volumetric grid as an upscaled grid in a numerical simulation.

13. An apparatus, comprising:
    at least one processing unit; and
    program code configured upon execution by the at least one processing unit to cluster a plurality of cells of an input unstructured volumetric grid representative of a subsurface volume into a plurality of clusters, each cluster having a boundary, simplify the boundary of each cluster among the plurality of clusters by combining one or more faces of one or more cells in each cluster among the plurality of clusters, and generate and store for use in a numerical simulation or visualization an output unstructured volumetric grid representing at least a portion of the input unstructured volumetric grid by generating in the output unstructured volumetric grid a respective cell for each of the plurality of clusters and having the simplified boundary, wherein the program code is configured to simplify the boundary of each cluster by:
        grouping outer and shared faces of cells in the clusters respectively into outer and shared boundaries;
        combining adjacent outer faces of outer boundaries while preserving general topology;
        combining adjacent shared faces of shared boundaries; and collapsing low connectivity vertices into adjacent higher connectivity vertices.

14. The apparatus of claim 13, wherein the program code is configured to generate a first cluster among the plurality of clusters by traversing adjacency data associated with the input unstructured volumetric grid, and selectively adding adjacent cells to the cluster based upon a clustering criterion.

15. The apparatus of claim 14, wherein the clustering criterion is based on a maximum distance from a cluster center to a cluster outer bound, a previous decision, a property of the cluster, a property of the adjacent cell, or a property of the input unstructured volumetric grid.

16. The apparatus of claim 13, wherein the program code is configured to cluster the plurality of cells by generating a first cluster among the plurality of clusters by traversing adjacency data associated with the input unstructured volumetric grid and selectively adding adjacent cells to the cluster based upon a clustering criterion, and wherein the program code is further configured to determine one or more properties used when evaluating the clustering criterion during a pre-processing stage prior to clustering the plurality of cells.

17. The apparatus of claim 13, wherein the program code is further configured to remove repeated vertices in faces, remove faces with less than three line segments and remove clusters with less than four faces.

18. The apparatus of claim 13, wherein the program code is further configured to generate a visualization using the output unstructured volumetric grid by using one or more cells from the output unstructured volumetric grid for one or more background regions of the visualization and using one or more cells from the input unstructured volumetric grid for one or more foreground regions of the visualization.

19. A program product, comprising:
a non-transitory computer readable medium; and
program code stored on the computer readable medium and configured upon execution by at least one processing unit to cluster a plurality of cells of an input unstructured volumetric grid representative of a subsurface volume into a plurality of clusters, each cluster having a boundary, simplify the boundary of each cluster among the plurality of clusters by combining one or more faces of one or more cells in each cluster among the plurality of clusters, and generate and store for use in a numerical simulation or visualization an output unstructured volumetric grid representing at least a portion of the input unstructured volumetric grid by generating in the output unstructured volumetric grid a respective cell for each of the plurality of clusters and having the simplified boundary, wherein the program code is configured to cluster the plurality of cells by generating a first cluster among the plurality of clusters by traversing adjacency data associated with the input unstructured volumetric grid and selectively adding adjacent cells to the cluster based upon a clustering criterion, and wherein the program code is further configured to determine one or more properties used when evaluating the clustering criterion during a pre-processing stage prior to clustering the plurality of cells.

20. The program product of claim 19, wherein the program code is configured to simplify the boundary of each cluster by:
grouping outer and shared faces of cells in the clusters respectively into outer and shared boundaries;
combining adjacent outer faces of outer boundaries while preserving general topology;
combining adjacent shared faces of shared boundaries; and
collapsing low connectivity vertices into adjacent higher connectivity vertices.

\* \* \* \* \*